US008379011B2

(12) United States Patent
Bae et al.

(10) Patent No.: US 8,379,011 B2
(45) Date of Patent: Feb. 19, 2013

(54) DRIVING DEVICE, DISPLAY APPARATUS HAVING THE SAME AND METHOD OF DRIVING THE DISPLAY APPARATUS

(75) Inventors: Hyeon-Seok Bae, Asan-si (KR); Sang-Hoon Lee, Yongin-si (KR); Cheol-Ho Lee, Cheonan-si (KR); Hun-Tae Kim, Asan-si (KR)

(73) Assignee: Samsung Display Co., Ltd. (KR)

(*) Notice: Subject to any disclaimer, the term of this patent is extended or adjusted under 35 U.S.C. 154(b) by 1265 days.

(21) Appl. No.: 12/145,825

(22) Filed: Jun. 25, 2008

(65) Prior Publication Data

US 2009/0021507 A1 Jan. 22, 2009

(30) Foreign Application Priority Data

Jul. 20, 2007 (KR) ........................ 10-2007-0073094

(51) Int. Cl.
*G06F 3/038* (2006.01)
*G09G 5/00* (2006.01)
*G09G 3/36* (2006.01)

(52) U.S. Cl. .......................................... 345/212; 345/87

(58) Field of Classification Search .................. 345/204, 345/211, 212, 213, 87; 257/208
See application file for complete search history.

(56) References Cited

U.S. PATENT DOCUMENTS

| | | | | |
|---|---|---|---|---|
| 3,464,036 | A * | 8/1969 | Robinson et al. | 333/81 R |
| 5,900,855 | A | 5/1999 | Kweon | |
| 6,219,016 | B1 * | 4/2001 | Lee | 345/87 |
| 6,373,479 | B1 * | 4/2002 | Moon | 345/211 |
| 7,202,864 | B2 * | 4/2007 | Park | 345/211 |
| 2005/0162363 | A1 * | 7/2005 | Kim | 345/92 |
| 2006/0139291 | A1 * | 6/2006 | Cho et al. | 345/100 |
| 2007/0132701 | A1 * | 6/2007 | Jeon | 345/100 |
| 2007/0182683 | A1 | 8/2007 | Chin et al. | |

FOREIGN PATENT DOCUMENTS

| | | | |
|---|---|---|---|
| EP | 1764776 | B1 | 10/2008 |
| KR | 1020050018287 | | 2/2005 |
| KR | 1020050053059 | | 6/2005 |
| KR | 1020050069039 | | 7/2005 |

OTHER PUBLICATIONS

SDLS033_sn74ls08, Mar. 1988, Texas Instruments, p. 1.*
SCAS532D_sn74ac11, Oct. 2003, Texas Instruments, p. 1.*
Jerome Patoux, Low-Dropout Regulators, May 2007, Analog Dialogue 41-05, p. 2.*
John C. Cowles in RF and Microwave Semiconductor Device Handbook, Mike Golio Editor, 2003, CRC Press, p. 4-14.*
Mike Golio; "RF and Microwave Semiconductor Device Handbook" CRC Press LLC 2001, pp. 11-18.
Quadruple 2-Input Positive-And Gates; SDLS033 Dec. 1983—Revised Mar. 1988, Texas Instruments Incorporated.

* cited by examiner

*Primary Examiner* — Alexander S Beck
*Assistant Examiner* — Joseph Pena
(74) *Attorney, Agent, or Firm* — Cantor Colburn LLP

(57) ABSTRACT

A driving device includes an output timing controller which controls an output timing of a first driving voltage and a second driving voltage respectively generated from a first voltage generator and a second voltage generator. A third driving voltage output from the output timing controller is provided to a first data driver and a second data driver, and also provided to a gamma voltage generator to generate a plurality of gamma voltages. Accordingly, a reverse electric potential between the third driving voltage and the gamma voltages is prevented from being generated in the first and second data drivers, therefore, preventing the first and second data drivers from being damaged.

16 Claims, 8 Drawing Sheets

DRIVING DEVICE, DISPLAY APPARATUS HAVING THE SAME AND METHOD OF DRIVING THE DISPLAY APPARATUS

This application claims priority to Korean Patent Application No. 2007-73094 filed on Jul. 20, 2007, and all the benefits accruing therefrom under 35 U.S.C. §119, the contents of which is in its entirety is herein incorporated by reference.

BACKGROUND OF THE INVENTION

1. Field of the Invention

The present invention relates to a driving device, a display apparatus having the display device and a method of driving the display apparatus. More particularly, the present invention relates to a driving device which prevents a damage of a data driver thereof, a display apparatus having the driving device, and a method of driving the display apparatus.

2. Description of the Related Art

A liquid crystal display includes a liquid crystal display panel which displays an image and a driving device which drives the liquid crystal display panel. The driving device includes a gate driver supplying a gate signal to the liquid crystal display panel and a data driver supplying a data signal to the liquid crystal display panel. Also, the driving device further includes a voltage generator which applies a driving voltage to the gate driver and the data driver and a gamma voltage generator which generates a gamma voltage.

When a size of the liquid crystal display panel becomes larger, an output voltage of the driving voltage is insufficient to drive the large-scaled liquid crystal display panel. Therefore, the driving device employs a plurality of voltage generators. When the driving device includes two voltage generators, the data driver is divided into two groups of left-driving chips arranged at left side of the liquid crystal display panel and right-driving chips arranged at right side of the liquid crystal display panel. The-left driving chips and the right-driving chips receive different driving voltages from the two voltage generators, respectively.

However, a time interval is generated between the driving voltages output from the two voltage generators. That is, when the driving voltages having the time interval are applied to the left-driving chips and the right-driving chips, respectively, the left-driving chips and the right-driving chips are operated at different timings. Consequently, a time interval is generated between left and right images displayed on the liquid crystal display panel, therefore causing a deterioration of display quality thereof.

Meanwhile, the gamma voltage generator receives the driving voltage from one of the two voltage generators and generates the gamma voltages to provide the gamma voltages to the left-driving chips and the right-driving chips.

When the time interval is generated between the driving voltages output from the two voltage generators, either the left-driving chips or the right-driving chips receive the gamma voltages before the driving voltage is applied thereto. However, since the driving voltage is designed to have a higher electric potential than those of the gamma voltages in the driving chips, the gamma voltages have a higher electric potential than that of the driving voltage and the driving chip is damaged due to a reverse electric potential.

BRIEF SUMMARY OF THE INVENTION

The present invention has made an effort to solve the above-stated problems and aspects of the present invention provides a driving device capable of preventing a damage of a data driver, a display apparatus capable of improving a display quality and preventing the damage of the data driver, and a method of driving the display apparatus.

An exemplary embodiment of the present invention provides a driving device which includes a first voltage generator which receives power from an exterior power source and outputs a first driving voltage, a second voltage generator which receives the power and outputs a second driving voltage, an output timing controller which receives the first and second driving voltages from the first and second voltage generators, respectively, and outputs a third driving voltage at a predetermined timing, a gamma voltage generator which receives the third driving voltage from the output timing controller and outputs a plurality of gamma voltages, a first data driver which operates in response to the third driving voltage from the output timing controller and changes a first image signal to a first data signal based on the gamma voltages provided from the gamma voltage generator, and a second data driver which operates in response to the third driving voltage from the output timing controller and changes a second image data to a second data signal based on the gamma voltages provided from the gamma voltage generator.

In another exemplary embodiment, the present invention provides a driving device which includes a plurality of voltage generators which receive a power voltage from an exterior power source and outputs a plurality of data drivers, an output timing controller which receives the driving voltages from the voltage generators and outputs a common driving voltage at a predetermine time in response to a timing control signal, a gamma voltage generator which receives the common voltage from the output timing controller and outputs a plurality of gamma voltages, and a plurality of data drivers which operates in response to the common driving voltage from the output timing controller and changes an image signal to a data signal based on the gamma voltages provided from the gamma voltage generator.

According to another aspect, the present invention provides a display apparatus which includes a first voltage generator which receives a power voltage from an exterior power source and outputs a first driving voltage, a second voltage generator which receives the power voltage and outputs a second driving voltage, an output timing controller receives the first and second driving voltages from the first and second voltage generators, respectively, and outputs a third driving voltage at a predetermined time, a gamma voltage generator which receives the third driving voltage from the output timing controller to output a plurality of gamma voltages, a first data driver which operates in response to the third driving voltage from the output timing controller and changes a first image signal to a first data signal based on the gamma voltages provided from the gamma voltage generator, a second data driver which operates in response to the third driving voltage from the output timing controller and changes a second image signal to a second data signal based on the gamma voltages provided from the gamma voltage generator, a gate driver which receives a gate-on voltage and a gate-off voltage output from either the first voltage generator or the second voltage generator and sequentially outputs a gate signal, and a display panel which receives the first and second data signals in response to the gate signal to display an image.

In another exemplary embodiment, the present invention provides a method of driving a display apparatus which includes outputting a first driving voltage and a second driving voltage when a power voltage, outputting a third driving voltage when the first and second driving voltages are in a high state, outputting a plurality of gamma voltages in response to the third driving voltage, and changing a first image signal and a second image signal to a first data signal and a second data signal based on the gamma voltages, respectively, in response to the third driving voltage, sequentially outputting a gate signal, and displaying an image corresponding to the first and second data signals in response to the gate signal.

According to the above exemplary embodiments, when the driving device includes two or more voltage generators, the output timing controller removes a time interval between the driving voltages output from the two or more voltage generators. Thus, the data driver may be prevented from being damaged, and the time interval between images displayed in left and right sides of the display panel may be removed, therefore improving the display quality of the images.

BRIEF DESCRIPTION OF THE DRAWINGS

The above and/or other aspects, features and advantages of the present invention will become apparent from the following detailed description when taken in conjunction with the accompanying drawings, in which.

DETAILED DESCRIPTION OF THE INVENTION

Figure 1:
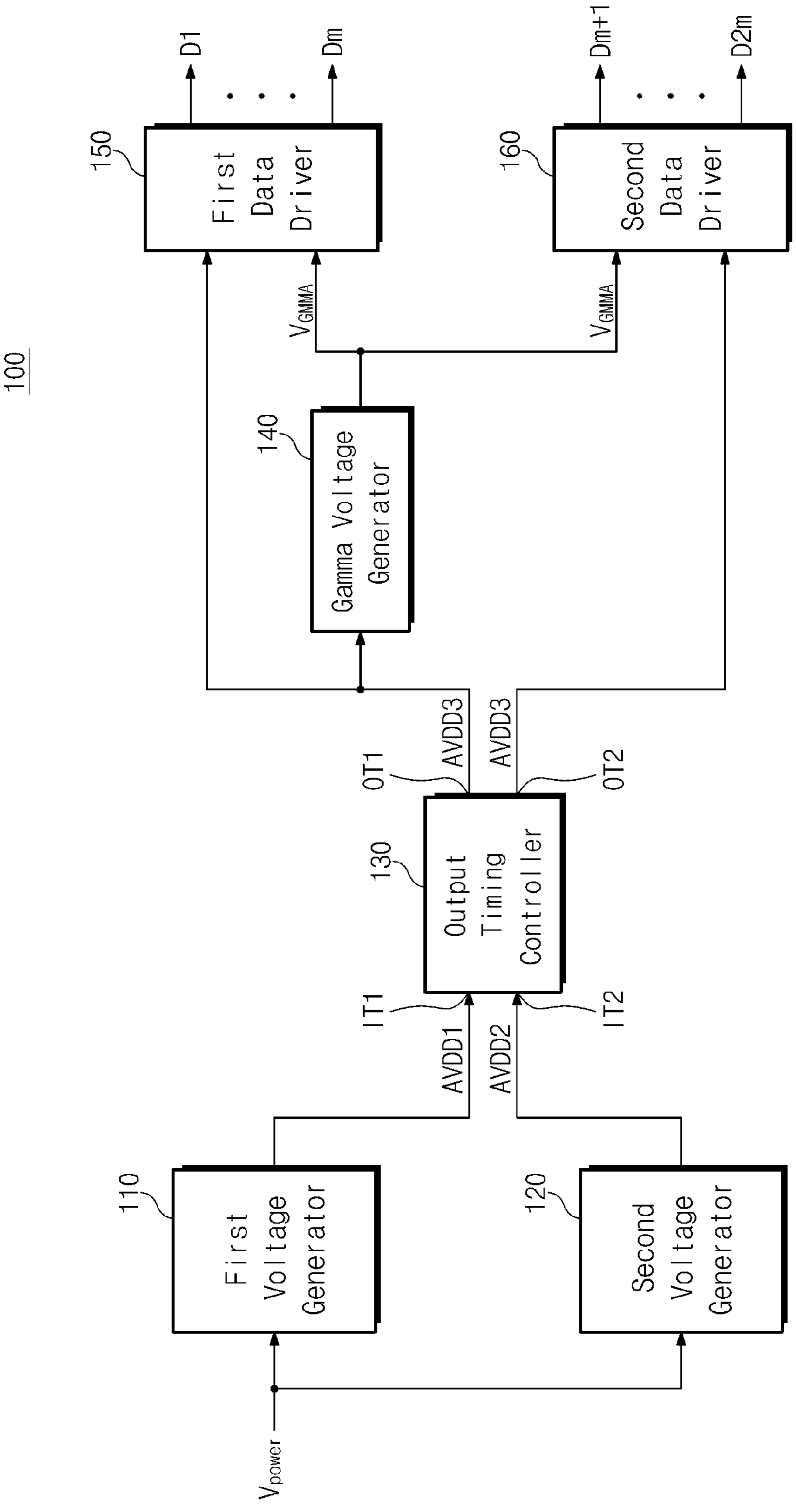
FIG. 1 is a block diagram illustrating an exemplary embodiment of a driving device according to the present invention.

The invention is described more fully hereinafter with reference to the accompanying drawings, in which exemplary embodiments of the invention are shown. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a block diagram illustrating an exemplary embodiment of a driving device according to the present invention.

Referring to FIG. 1, a driving device 100 includes a first voltage generator 110, a second voltage generator 120, an output timing controller 130, a gamma voltage generator 140, a first data driver 150, and a second data driver 160.

The first and second voltage generators 110 and 120 receive a power voltage Vpower from an exterior power source (not shown) and each of the first and second voltage generators 110 and 120 outputs a first driving voltage AVDD1 and a second driving voltage AVDD2, respectively. Since the first and second driving voltages AVDD1 and AVDD2 are generated from different voltage generators, according to an exemplary embodiment, the first and second driving voltages AVDD1 and AVDD2 include a different voltage level from each other as a time lapses. According to another exemplary embodiment of the present embodiment, the second driving voltage AVDD2 is generated later than the first driving voltage AVDD1.

The first and second driving voltages AVDD1 and AVDD2 output from the first and second voltage generators 110 and 120, respectively, are provided to the output timing controller 130. The output timing controller 130 receives the first and second driving voltages AVDD1 and AVDD2 which are generated with a time interval and simultaneously outputs a third driving voltage AVDD3 through its first and second output terminals OT1 and OT2 at a predetermined time period. That is, the output timing controller 130 synchronizes the first and second driving voltages AVDD1 and AVDD2 which are generated with the time interval.

The gamma voltage generator 140 is electrically connected to the first output terminal OT1 of the output timing controller 130 and receives the third driving voltage AVDD3 from the first output terminal OT1. According to an exemplary embodiment, the gamma voltage generator 140 outputs a plurality of gamma voltages $V_{GAMMA}$ having different voltage levels based on the third driving voltage AVDD3 from the first output terminal OT1. In the current exemplary embodiment, the gamma voltage generator 140 includes a resistance string connected between the third driving voltage AVDD3 and a source voltage (not shown). Further, in the current exemplary embodiment, the source voltage includes a voltage level that is equal to or lower than a ground voltage.

The gamma voltage generator 140 outputs the gamma voltages $V_{GAMMA}$ each having a voltage level within a range of the third driving voltage AVDD3 to the source voltage (not shown). That is, when a number of resistances included in the resistance string is R, the gamma voltage generator 140 may output R−1 gamma voltages $V_{GAMMA}$ that are voltage-divided by the R resistances.

The first data driver 150 is electrically connected to the first output terminal OT1 of the output timing controller 130 and operated in response to the third driving voltage AVDD3 from the first output terminal OT1, and the second data driver 160 is electrically connected to the second output terminal OT2 of the output timing controller 130 and operated in response to the third driving voltage AVDD3 from the second output terminal OT2.

Also, the first and second data drivers 150 and 160 receive the gamma voltages $V_{GAMMA}$ from the gamma voltage generator 140. The gamma voltage generator 140 generates the gamma voltages $V_{GAMMA}$ based on the third driving voltage AVDD3 output from the first output terminal OT1 of the output timing controller 130, so that the gamma voltages $V_{GAMMA}$ are provided to the first and second data drivers 150 and 160 later than the third driving voltage AVDD3. When a voltage level of the third driving voltage AVDD3 is lower than that of the gamma voltages $V_{GAMMA}$, a reverse electric potential is generated, and thus, PN-junction regions of the first and second data drivers 150 and 160 may be damaged.

However, in the present invention, according to an exemplary embodiment, since the gamma voltages $V_{GAMMA}$ are generated later than the third driving voltage AVDD3, the reverse electric potential in which the voltage level of the third driving voltage AVDD3 is lower than those of the gamma voltages $V_{GAMMA}$ is not generated in both of the first and second data drivers 150 and 160. Accordingly, the PN-junction regions of the first and second data drivers 150 and 160 are prevented from being damaged.

The first data driver 150 changes a first image signal provided from an exterior to a first data signal D1~Dm based on the gamma voltages $V_{GAMMA}$ to output the first data signal D1~Dm, and the second data driver 160 changes a second image signal provided from an exterior to a second data signal Dm+1~D2*m* based on the gamma voltages $V_{GAMMA}$ to output the second data signal Dm+1~D2*m*.

Figure 2:
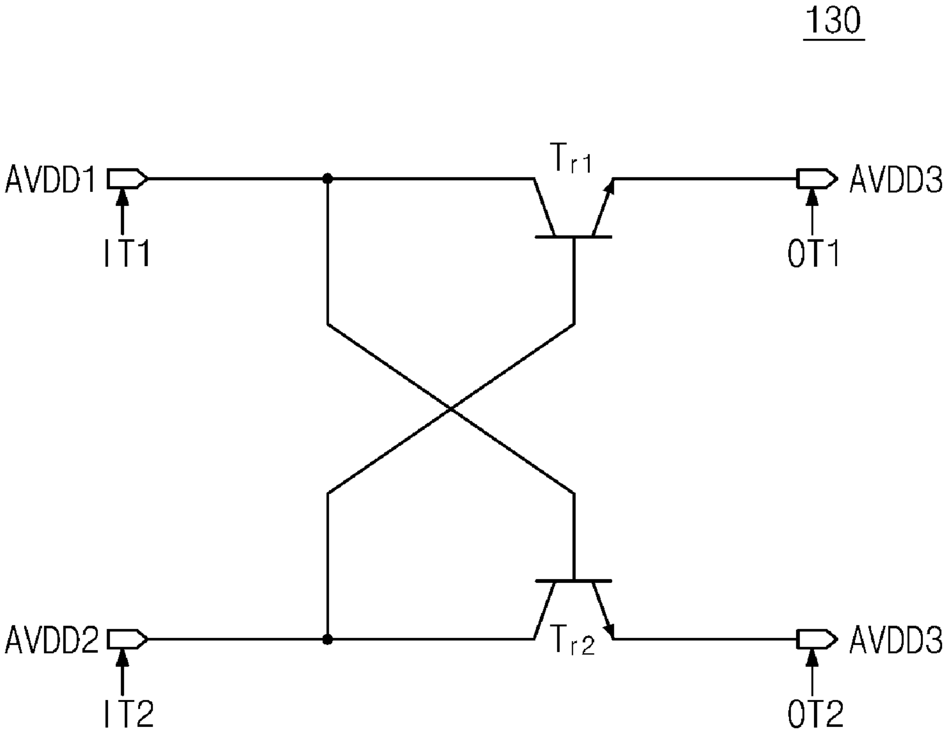
FIG. 2 is a circuit diagram illustrating an exemplary embodiment of an output timing controller of FIG. 1, according to the present invention.
Figure 3:
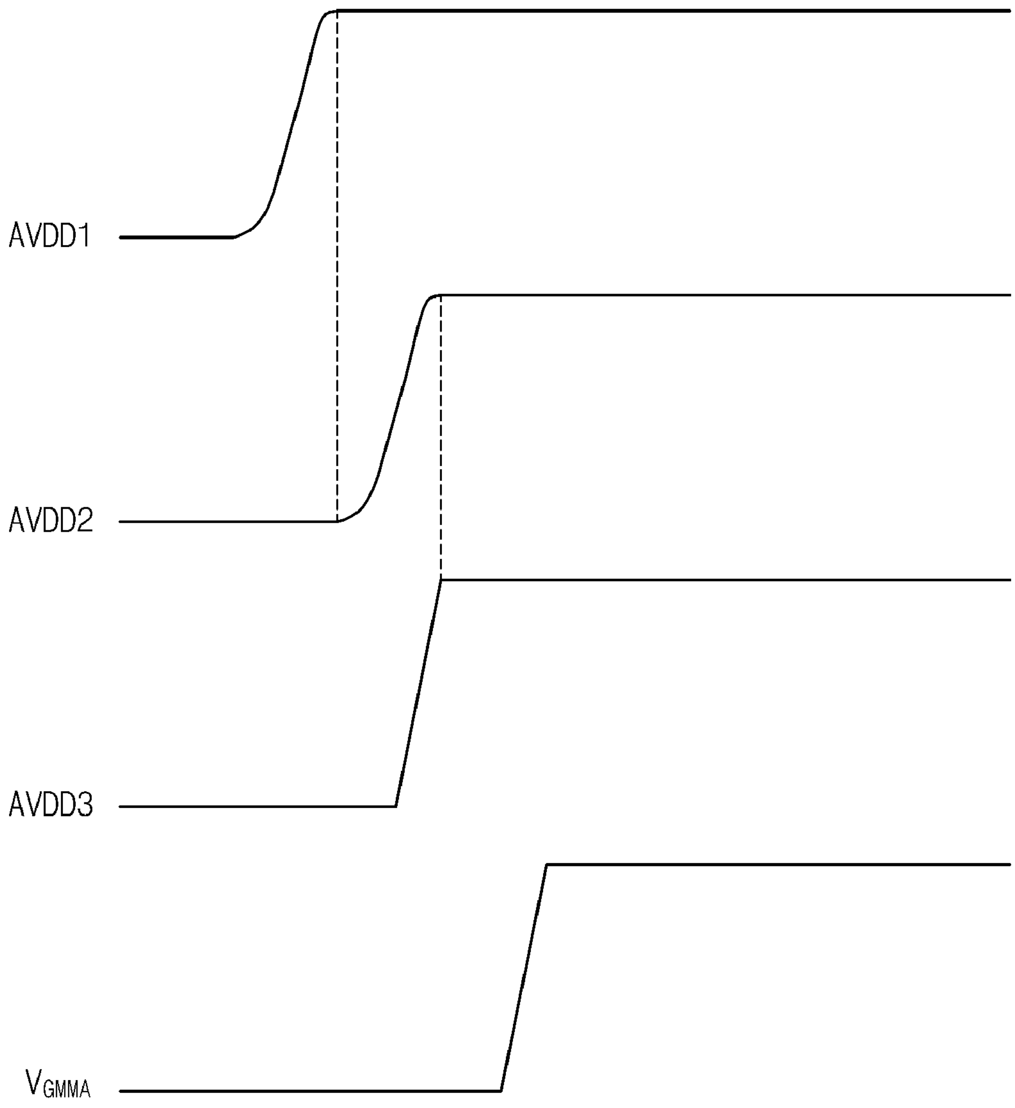
FIG. 3 is a waveform diagram illustrating an exemplary embodiment of input and output of the output timing controller of FIG. 2, according to the present invention.

FIG. 2 is a circuit diagram illustrates the output timing controller 130 of FIG. 1, and FIG. 3 is a waveform diagram illustrates input and output of the output timing controller 130 of FIG. 2.

Referring to FIGS. 2 and 3, the output timing controller 130 includes a first input terminal IT1 receiving the first driving voltage AVDD1 from the first voltage generator 110 (shown in FIG. 1), a second input terminal IT2 receiving the second driving voltage AVDD2 from the second voltage generator 120 (shown in FIG. 1), and the first and second output terminals OT1 and OT2 which simultaneously output the third driving voltage AVDD3. Also, the output timing controller 130 includes a first transistor Tr1 arranged between the first input terminal IT1 and the first output terminal OT1 and a second transistor Tr2 arranged between the second input terminal IT2 and the second output terminal OT2.

According to an exemplary embodiment, the first transistor Tr1 includes an input electrode connected to the first input terminal IT1, a control electrode connected to the second input terminal IT2, and an output electrode connected to the first output terminal OT1, and the second transistor Tr2 includes an input electrode connected to the second input terminal IT2, a control electrode connected to the first input terminal IT1, and an output electrode connected to the second output terminal OT2.

Thus, the first transistor Tr1 outputs the third driving voltage AVDD3 in response to the second driving voltage AVDD2, and the second transistor Tr2 outputs the third driving voltage AVDD3 in response to the first driving voltage AVDD1. That is, when both of the first and second driving voltages AVDD1 and AVDD2 are in a high state, the first and second transistors Tr1 and Tr2 simultaneously output the third driving voltage AVDD3 at the high state through the first and second output terminals OT1 and OT2, respectively. However, when either one of the first and second driving voltages AVDD1 and AVDD2 is in a low state, the first and second transistors Tr1 and Tr2 do not output the third driving voltage AVDD3 at the high state.

Consequently, according to an exemplary embodiment, the output timing controller 130 simultaneously outputs the third driving voltage AVDD3 through the first and second output terminals OT1 and OT2 only when both of the first and second driving voltages AVDD1 and AVDD2 are generated in the high state, and the third driving voltage AVDD3 output from the output timing controller 130 is provided to the gamma voltage generator 140, the first data driver 150, and the second data driver 160. As previously mentioned above, since the gamma voltage generator 140 generates the gamma voltages $V_{GAMMA}$ based on the third driving voltage AVDD3, the gamma voltages $V_{GAMMA}$ are applied to the first and second data drivers 150 and 160 later than the third driving voltage AVDD3. Accordingly, the first and second data drivers 150 and 160 is prevented from being damaged by the reverse electric potential in which the gamma voltages $V_{GAMMA}$ have the higher electric potential than that of the third driving voltage AVDD3.

Figure 4:
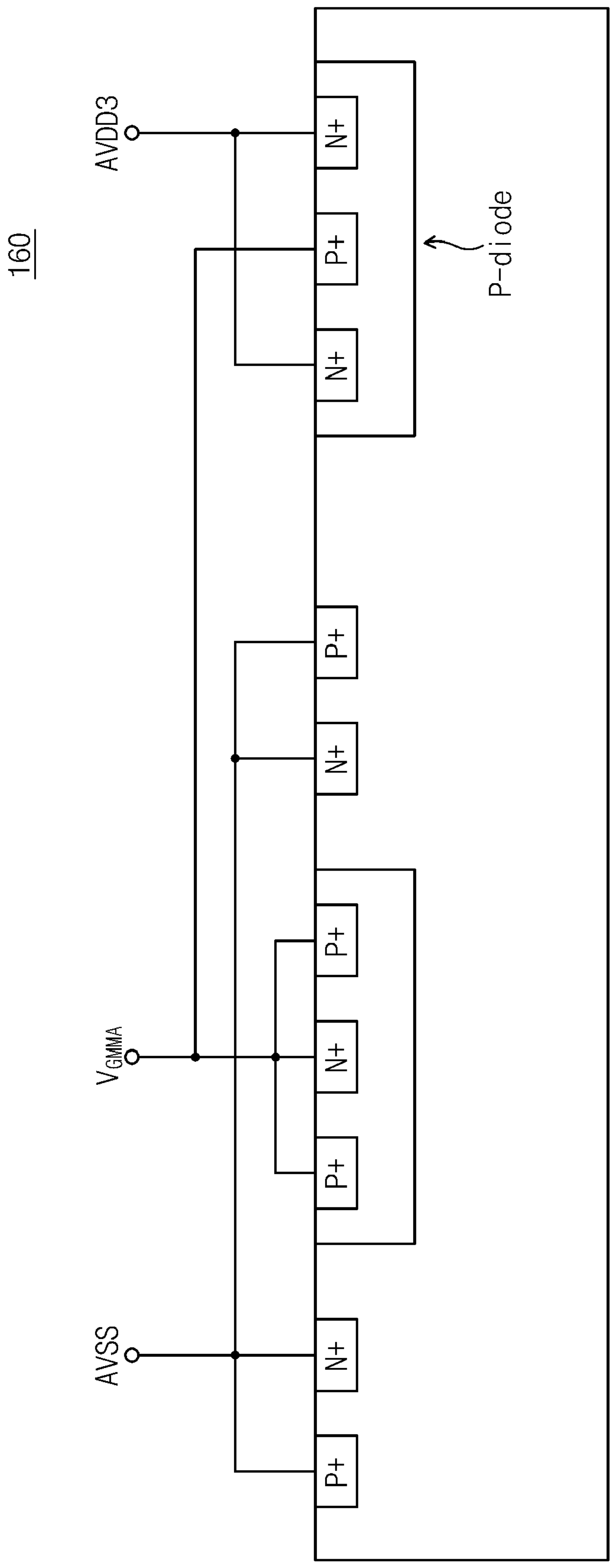
FIG. 4 is a schematic sectional view illustrating an exemplary embodiment a second data driver of FIG. 1, according to the present invention.

FIG. 4 is a schematic sectional view illustrating the second data driver of FIG. 1.

Referring to FIG. 4, the second data driver 160 includes a P-type diode P-diode. In the P-type diode P-diode, the third driving voltage AVDD3 is applied to an N-type doping area N+, and the gamma voltages $V_{GAMMA}$ are applied to a P-type doping area P+. If the gamma voltages $V_{GAMMA}$ have the high electric potential than that of the third driving voltage AVDD3, the reverse electric potential is generated in the P-type diode P-diode, thereby damaging the PN-junction region. However, in the present invention, since the gamma voltages $V_{GAMMA}$ are applied to the second data driver 160 later than the third driving voltage AVDD3, the gamma voltages $V_{GAMMA}$ includes lower electric potentials than that of the third driving voltage AVDD3. Thus, the PN-junction region of the second data driver 160 is prevented from being damaged by the reverse electric potential. In the present exemplary embodiment, a node AVSS includes a voltage level equal to or lower than a ground voltage.

Figure 5:
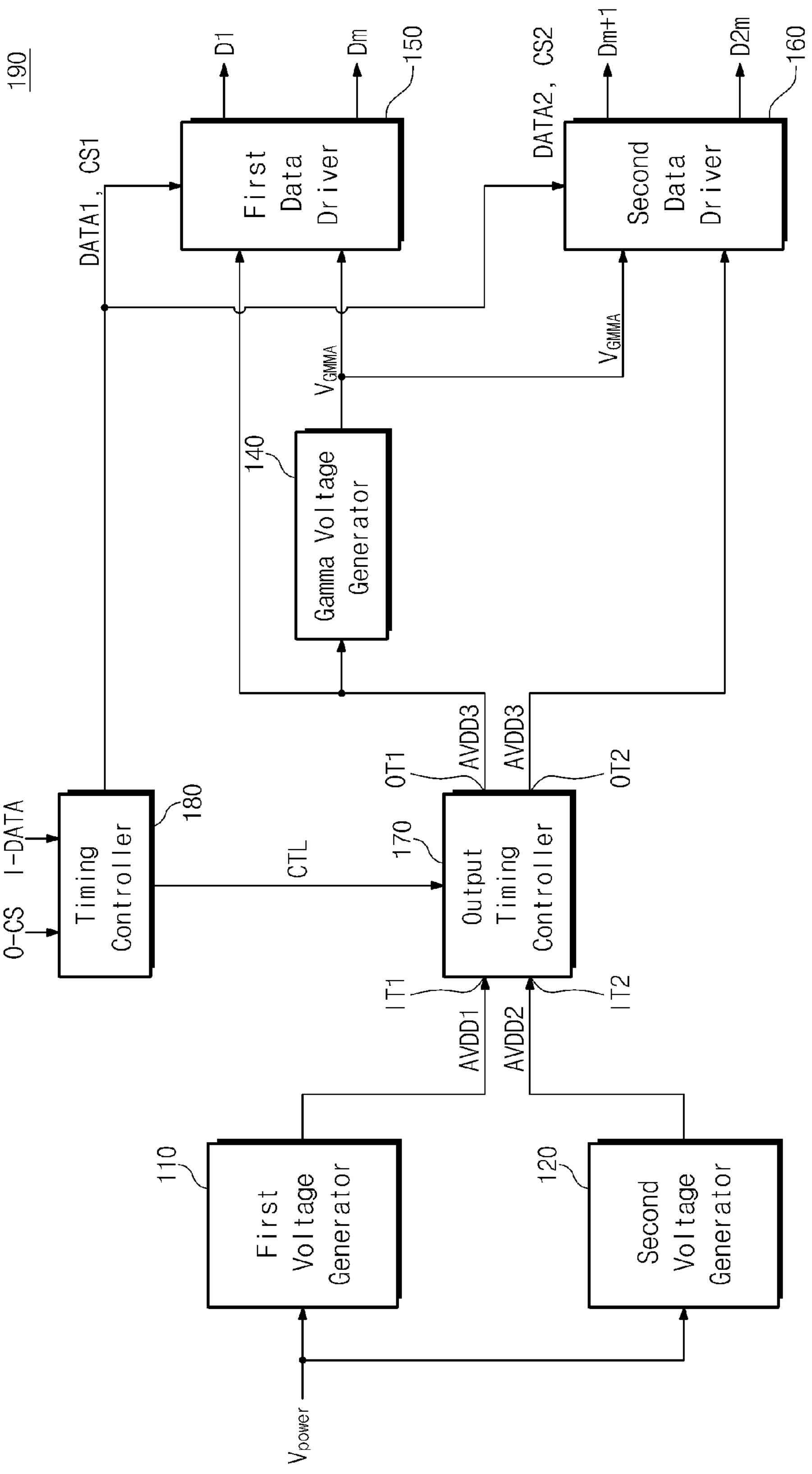
FIG. 5 is a block diagram illustrating another exemplary embodiment of a driving device according to the present invention.
Figure 6:
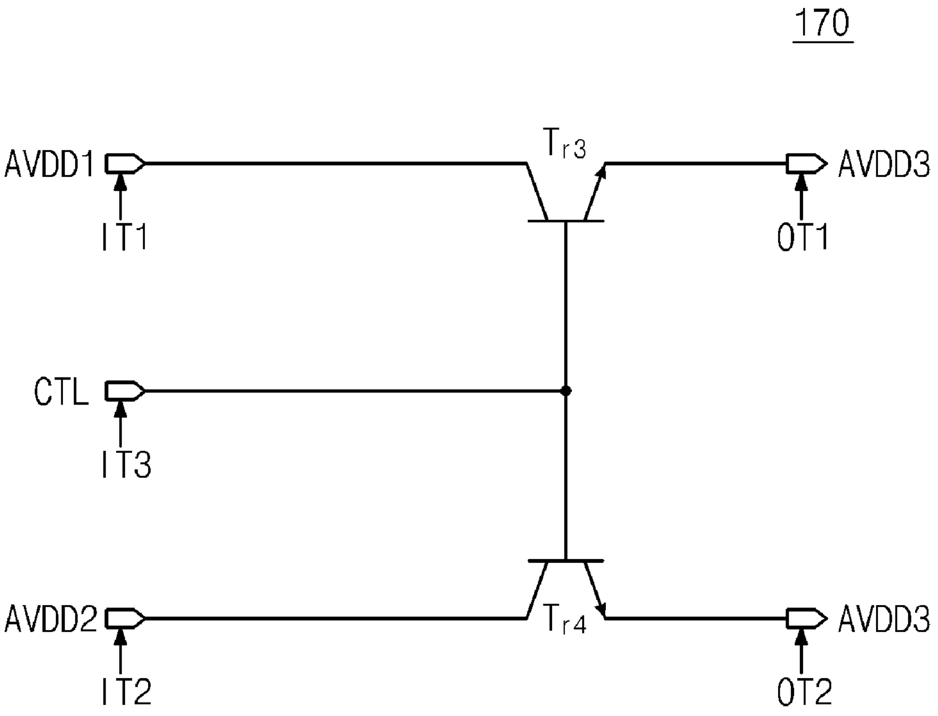
FIG. 6 is a circuit diagram illustrating an output timing controller of FIG. 5, according to the present invention.
Figure 7:
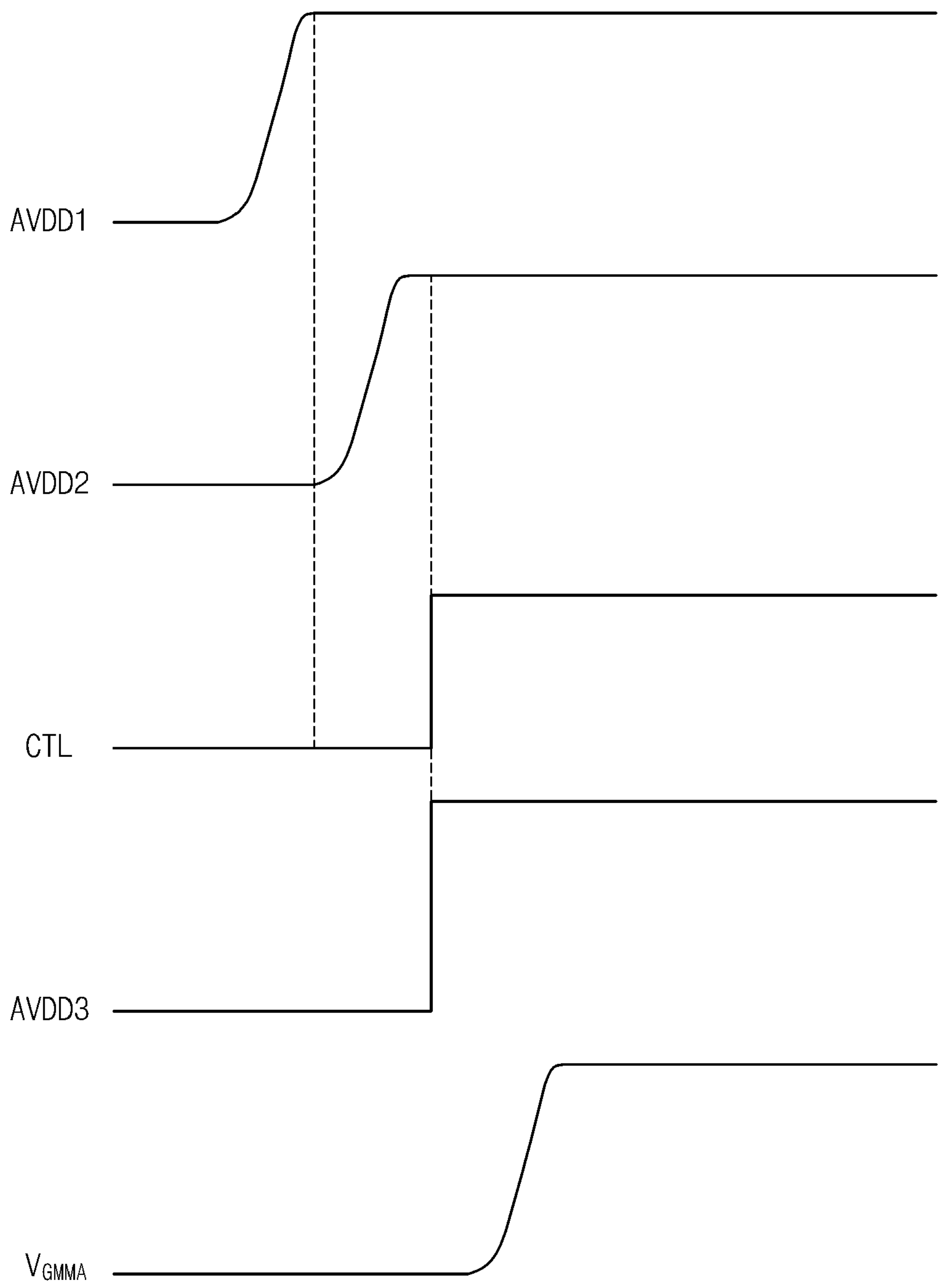
FIG. 7 is a waveform diagram illustrating an exemplary embodiment of an input and output of the output timing controller, according to the present invention.

FIG. 5 is a block diagram illustrating another exemplary embodiment of a driving device according to the present invention, FIG. 6 is a circuit diagram showing the output timing controller of FIG. 5, and FIG. 7 is a waveform diagram showing input and output of the output timing controller. In FIG. 5, the same reference numerals denote the same elements in FIG. 1, and thus the detailed descriptions of the same elements will be omitted.

Referring to FIG. 5, a driving device 190 further includes a timing controller 180 which outputs a timing control signal CTL to an output timing controller 170.

According to an exemplary embodiment, the timing controller 180 receives various control signals O-CS and an image signal I-DATA from an external device (not shown). The timing controller 180 generates a first data control signal CS1 and a second data control signal CS2 based on the various control signals O-CS and generates the timing control signal CTL in order to control the output timing controller 170.

The first data driver 150 receives a first image signal DATA1 in response to the first data control signal CS1 and changes the first image signal DATA1 to a first data signal D1~Dm based on the gamma voltages $V_{GAMMA}$ to output the first data signal D1~Dm. The second data driver 160 receives a second image signal DATA2 in response to the second data control signal CS2 and changes the second image signal DATA2 to a second data signal Dm+1~D2*m* based on the gamma voltages $V_{GAMMA}$ to output the second data signal Dm+1~D2*m*.

According to an exemplary embodiment, the output timing controller 170 controls an output timing of a third driving voltage AVDD3 from the output timing controller 170 based on the timing control signal CTL.

As shown in FIGS. 6 and 7, the output timing controller 170 includes a first input terminal IT1 receiving a first driving voltage AVDD1 from the first voltage generator 110 (shown in FIG. 5), a second input terminal IT2 receiving a second driving voltage AVDD2 from the second voltage generator 120 (shown in FIG. 5), a third input terminal IT3 receiving the timing control signal CTL, and a first output terminal OT1 and a second output terminal OT2 that substantially simultaneously output the third driving voltage AVDD3. Also, the output timing controller 170 includes a third transistor Tr3 arranged between the first input terminal IT1 and the first output terminal OT1 and a fourth transistor Tr4 arranged between the second input terminal IT2 and the second output terminal OT2.

According to an exemplary embodiment, the third transistor Tr3 includes an input electrode connected to the first input terminal IT1, a control electrode connected to the third input terminal IT3, and an output electrode connected to the first output terminal OT1, and the fourth transistor Tr4 includes an input electrode connected to the second input terminal IT2, a control electrode connected to the third input terminal IT3, and an output electrode connected to the second output terminal OT2.

Accordingly, the third and fourth transistors Tr3 and Tr4 output the third driving voltage AVDD3 in response to the timing control signal CTL. That is, when the timing control signal CTL is generated in a high state, the third and fourth transistors Tr3 and Tr4 simultaneously output the third driving voltage AVDD3 at the high state through the first and second output terminals OT1 and OT2, respectively. The timing control signal CTL is generated in the high state during a period where both the first and second driving voltages AVDD1 and AVDD2 are in the high state, and such states of the timing control signal CTL is controlled by the timing controller 180.

As a result, the output timing controller 170 are simultaneously output the third driving voltage AVDD3 through the first and second output terminals OT1 and OT2 only when both the first and second driving voltages AVDD1 and AVDD2 are generated in the high state, and the third driving voltage AVDD3 output from the output timing controller 170 is provided to the gamma voltage generator 140, the first data driver 150, and the second data driver 160. Since the gamma voltage generator 140 generates the gamma voltages $V_{GAMMA}$ based on the third driving voltage AVDD3, the gamma voltages $V_{GAMMA}$ are applied to the first and second data drivers 150 and 160 later than the third driving voltage AVDD3 all the time. Thus, the first and second data drivers 150 and 160 are prevented from being damaged by the reverse electric potential in which the gamma voltages $V_{GAMMA}$ have the higher electric potentials than that of the third driving voltage AVDD3.

Figure 8:
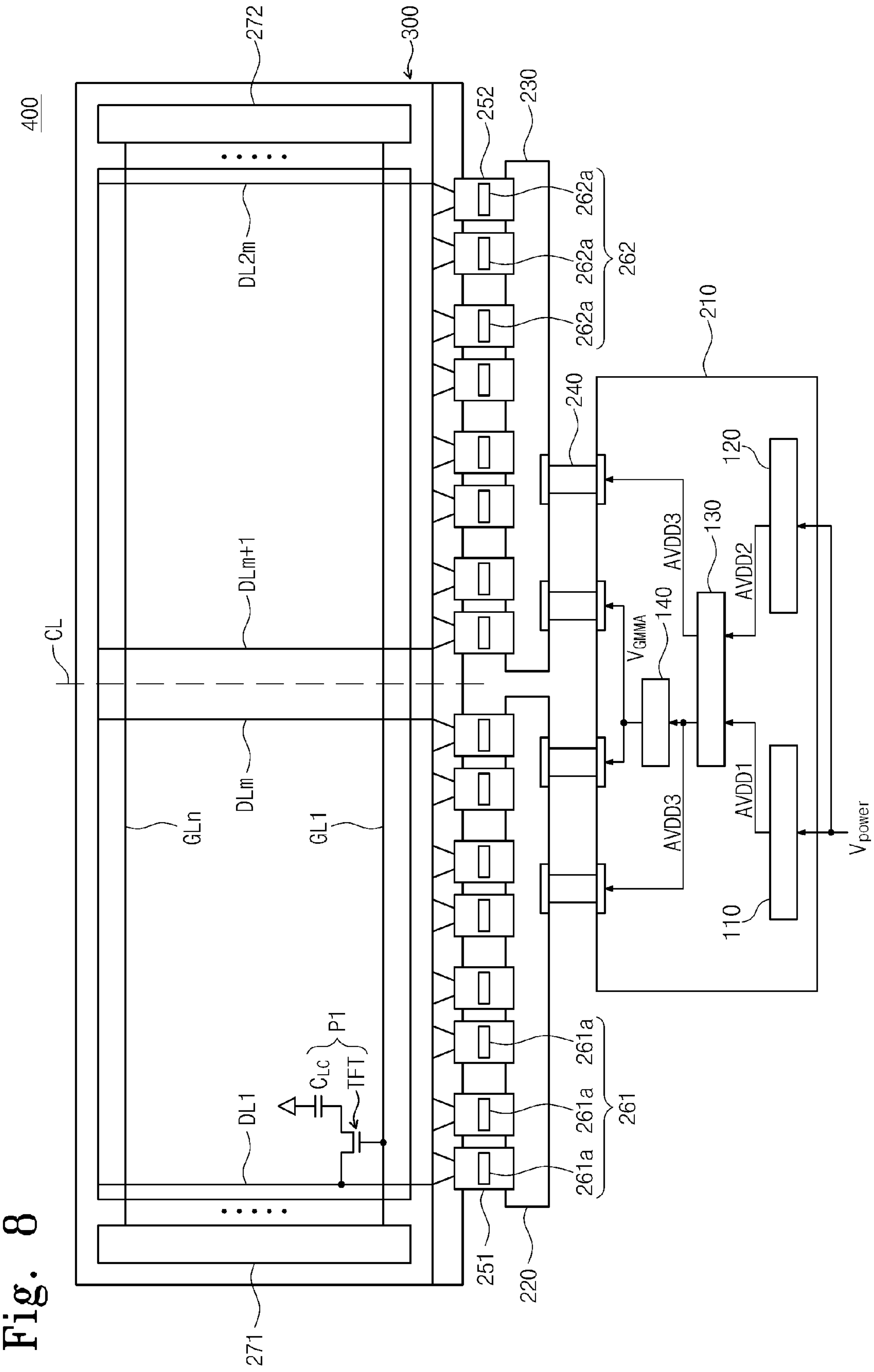
FIG. 8 is a block diagram illustrating an exemplary embodiment of a display apparatus according to the present invention.

FIG. 8 is a block diagram illustrates an exemplary embodiment of a display apparatus according to the present invention.

Referring to FIG. 8, a display apparatus 400 includes a display panel 300, a main printed circuit board 210, a first data printed circuit board 220, a second data printed circuit board 230, a first data driver 261, a second data driver 262, a first gate driver 271, and a second gate driver 272.

According to an exemplary embodiment, the main printed circuit board 210 includes a first voltage generator 110, a second voltage generator 120, an output timing controller 130, and a gamma voltage generator 140 arranged thereon. According to an exemplary embodiment, the first and second voltage generators 110 and 120, the output timing controller 130, and the gamma voltage generator 140 are separately formed in a chip and mounted on the main printed circuit board 210. Since the first and second voltage generators 110 and 120, the output timing controller 130, and the gamma voltage generator 140 have been described in detail with reference to FIG. 1, the detailed descriptions thereof will be omitted.

The main printed circuit board 210 is electrically connected to the first and second data printed circuit boards 220 and 230 through a flexible circuit board 240. Accordingly, a third driving voltage AVDD3 output from the output timing controller 130 and a plurality of gamma voltages $V_{GAMMA}$ output from the gamma voltage generator 140 are provided to the first and second data printed circuit boards 220 and 230 through the flexible circuit board 240.

The first data printed circuit board 220 is electrically connected to the display panel 300 through a plurality of first tape carrier packages 251, and the second data printed circuit board 230 is electrically connected to the display panel 300 through a plurality of second tape carrier packages 252.

The first and second data drivers 261 and 262 includes a plurality of first driving chips 261*a* and a plurality of second driving chips 262*a*, respectively, and the first and second driving chips 261*a* and 262*a* may be mounted on the first and second tape carrier packages 251 and 252, respectively. Accordingly, the first and second driving chips 261*a* and 262*a* are operated in response to the third driving voltage AVDD3 and the gamma voltages $V_{GAMMA}$ output from the main printed circuit board 210.

The display panel 300 includes a plurality of gate lines GL1~GLn and a plurality of data lines DL1~DL2*m*. The gate lines GL1~GLn are insulated from the data lines DL1-DL2*m* and extended in a direction which intersects with the data lines DL1~DL2*m*. The data lines DL1~DL2*m* are divided into a first group data lines DL1~DLm arranged at a left side with respect to an imaginary line CL crossing a center of the display panel 300 and a second group data lines DLm+1~DL2*m* arranged at a right side with respect to the imaginary line CL. The first driving chips 261*a* are electrically connected to the first group data lines DL1~DLm to apply a first data signal to the first group data lines DL1~DLm, and the second driving chips 262*a* are electrically connected to the second group data lines DLm+1~DL2*m* to apply a second data signal to the second group data lines DLm+1~DL2*m*.

The first and second gate drivers 271 and 272 are arranged adjacent to both ends of the gate lines GL1~GLn, respectively. Each of the first and second gate drivers 271 and 272 receives a gate-on voltage and a gate-off voltage provided from the main printed circuit board 210 to sequentially output a gate signal. According to an exemplary embodiment, the gate signal output from the first and second gate drivers 271 and 272 is sequentially applied to the gate lines GL1~GLn through the both ends of the gate lines GL1~GLn.

In the display panel 300, a plurality of pixel areas are defined in a matrix configuration by the gate lines GL1~GLn and the data lines DL1~DL2*m*, and a plurality of pixels are arranged in the pixel areas, respectively. Each pixel includes a thin film transistor and a liquid crystal capacitor. According to an exemplary embodiment of the present invention, a thin film transistor TFT of a first pixel P1 includes a gate electrode connected to a first gate line GL1, a source electrode connected to a first data line DL1, and a drain electrode connected to the liquid crystal capacitor $C_{LC}$. Accordingly, the thin film transistor TFT outputs the first data signal through its drain electrode in response to the gate signal. The liquid crystal capacitor $C_{LC}$ includes a first electrode connected to the drain electrode, a second electrode receiving a common voltage, and a liquid crystal layer (not shown) interposed between the first electrode and the second electrode. Thus, a voltage which is equal to an electric potential difference between the first data signal applied to the drain electrode and the common voltage is charged to the liquid crystal capacitor $C_{LC}$, and a light transmittance of the liquid crystal layer is controlled according to the intensity of the charged voltage.

The display panel 300 controls the transmittance of the light provided from a rear or front side thereof using the liquid crystal layer, so that the image having a desired gray-scale may be displayed on the display panel 300.

When a size of the display panel 300 becomes larger, a driving voltage output from a voltage generator may be insufficient to drive the large-sized display panel 300, and thus, as described above, the main printed circuit board 210 includes the first voltage generator 110 and the second voltage generator 120. Also, according to an exemplary embodiment, the main printed circuit board 210 may further include the output timing controller 130 in order to prevent the occurrence of the time interval between the first driving voltage AVDD1 and the second driving voltage AVDD2 that are output from the first and second voltage generators 110 and 120, respectively.

The output timing controller 130 receives the first and second driving voltages AVDD1 and AVDD2 and substantially simultaneously provides the third driving voltage AVDD3 to the first and second data drivers 261 and 262. Thus, according to an exemplary embodiment, an operation timing of the first and second data drivers 261 and 262 is synchronized with each other by the third driving voltage AVDD3, and as a result, the image is simultaneously displayed in both the left and right regions of the display panel 300 with respect to the imaginary line CL.

According to an exemplary embodiment of the present invention, the driving device 100 includes the first and second voltage generators 110 and 120, the output timing controller 130 removes the time interval between the driving voltages AVDD1 and AVDD2 output from the first and second voltage generators 110 and 120. Thus, the operation timing of the first and second data drivers 150 and 160 which are respectively arranged in left and right sides of the display panel 300 (shown in FIG. 8, for example) are synchronized with each other. As a result, the time interval between the images displayed in the left and right regions of the display panel 300 are removed, thereby improving the display quality of the images.

Also, the gamma voltage generator 140 receives the third driving voltage AVDD3 from the output timing controller 130 and outputs the gamma voltages $V_{gamma}$, so that the gamma voltages $V_{gamma}$ may be applied to the first and second data drivers 150 and 160 later than the third driving voltage AVDD3. Therefore, the reverse electric potential between the gamma voltages $V_{gamma}$ and the third driving voltage AVDD3 is prevented from being generated in the first and second data drivers 150 and 160, thereby preventing the damage of the first and second data drivers 150 and 160.

While the present invention has been shown and described with reference to some exemplary embodiments thereof, it should be understood by those of ordinary skill in the art that various changes in form and detail may be made therein without departing from the spirit and scope of the present invention as defined by the appending claims.

What is claimed is:

1. A display apparatus comprising:

a first voltage generator which receives a power voltage from an exterior to output a first driving voltage;

a second voltage generator which receives the power voltage to output a second driving voltage;

an output timing controller which receives the first and second driving voltages from the first and second voltage generators, respectively, outputs a third driving voltage in response to the second driving voltage, and outputs a fourth driving voltage in response to the first driving voltage;

a gamma voltage generator which receives the third driving voltage from the output timing controller to output a plurality of gamma voltages;

a first data driver which operates in response to the third driving voltage from the output timing controller to change a first image signal to a first data signal based on the gamma voltages provided from the gamma voltage generator;

a second data driver which operates in response to the fourth driving voltage from the output timing controller to change a second image signal to a second data signal based on the gamma voltages provided from the gamma voltage generator;

a gate driver which receives a gate-on voltage and a gate-off voltage output from either the first voltage generator or the second voltage generator and sequentially outputs a gate signal; and a display panel which receives the first and second data signals in response to the gate signal to display an image, wherein the output timing controller simultaneously outputs the third driving voltage and the fourth driving voltage.

2. The display apparatus of claim 1, wherein the output timing controller comprises an AND-gate configuration which simultaneously outputs the third driving voltage and the fourth driving voltage when both the first and second driving voltages are in a high state.

3. The display apparatus of claim 2, wherein the timing controller comprises:

a first transistor comprising an input electrode which receives the first driving voltage, a control electrode which receives the second driving voltage, and an output electrode connected to a first output terminal of the output timing controller, the first transistor outputs the third driving voltage to the first output terminal in response to the second driving voltage; and a second transistor comprising an input electrode which receives the second driving voltage, a control electrode which receives the first driving voltage, and an output electrode connected to a second output terminal of the output timing controller, the second transistor outputs the fourth driving voltage to the second output terminal in response to the first driving voltage.

4. The display apparatus of claim 2, wherein the first data driver is connected to the first output terminal of the output timing controller and receives the third driving voltage, the second data driver is connected to the second output terminal of the output timing controller and receives the fourth driving voltage, the gamma voltage generator is connected to one of the first and second output terminals of the output timing controller and receives one of the third driving voltage and the fourth driving voltage from one of the first and second output terminals of the output timing controller, respectively, and the gamma voltage generator is connected to the first data driver and the second data driver.

5. The display apparatus of claim 1, further comprising a timing controller which generates a timing control signal and provides the timing control signal to the output timing controller.

6. The display apparatus of claim 5, wherein the output timing controller comprises:

a third transistor comprising an input electrode which receives the first driving voltage, a control electrode which receives the timing control signal, and an output electrode connected to a first output terminal of the output timing controller, the third transistor outputs the third driving voltage to the first output terminal in response to the timing control signal; and a fourth transistor comprising an input electrode which receives the second driving voltage, a control electrode receiving the timing control signal, and an output electrode connected to a second output terminal of the output timing controller, the fourth transistor outputs the fourth driving voltage to the second output terminal in response to the timing control signal.

7. The display apparatus of claim 6, wherein the timing control signal is in a high state during a period where both the first and second driving voltages are generated in the high state, and the first and second transistors simultaneously output the third driving voltage and the fourth driving voltage having the high state, respectively in response to the timing control signal having the high state.

8. The display apparatus of claim 1, further comprising a main printed circuit board on which the first and second voltage generators, the output timing controller, and the gamma voltage generator are mounted.

9. The display apparatus of claim 8, further comprising:

first and second printed circuit boards which respectively receive the third driving voltage and the fourth driving voltage, receive the gamma voltages from the main printed circuit board, and are electrically connected to the first and second data drivers, respectively;

a first tape carrier package interposed between the first printed circuit board and the display panel; and a second tape carrier package interposed between the second printed circuit board and the display panel.

10. The display apparatus of claim 9, wherein the first and second data drivers comprises a plurality of first data driving chips and a plurality of second data driving chips, respectively, and the first and second data driving chips are mounted on the first and second tape carrier packages, respectively.

11. The display apparatus of claim 10, wherein the display panel comprises:

a plurality of gate lines which sequentially receives the gate signal from the gate driver;

a plurality of first data lines which insulate from and intersect with the gate lines, the first data lines receive the first data signal from the first data driving chips; and a plurality of second data lines which insulate from and intersect with the gate lines, the second data lines which receive the second data signal from the second data driving chips.

12. The display apparatus of claim 11, wherein the first data lines are arranged at a left side with respect to an imaginary line crossing a center of the display panel to be parallel to the first data lines, and the second data lines are arranged at a right side with respect to the imaginary line.

13. The display apparatus of claim 1, wherein the first and second driving voltages include a different voltage level from each other as a time lapses.

14. The display apparatus of claim 13, wherein the second driving voltage is generated later than the first driving voltage.

15. A method of driving a display apparatus, comprising:

receiving a power voltage and outputting a first driving voltage and a second driving voltage;

outputting a third driving voltage to a gamma voltage generator and a first data driver, and outputting a fourth driving voltage to a second data driver when the first and second driving voltages are in a high state;

outputting a plurality of gamma voltages in response to the third driving voltage;

changing a first image signal to a first data signal in response to the third driving voltage based on the gamma voltages;

changing a second image signal to a second data signal in response to the fourth driving voltage based on the gamma voltages;

sequentially outputting a gate signal; and displaying an image corresponding to the first and second data signals in response to the gate signal, wherein the first driving voltage and the second driving voltage change from the low state to the high state at a different time, and wherein the third driving voltage and the fourth driving voltage are simultaneously output.

16. The method of claim 15, further comprising outputting the third driving voltage and the fourth driving voltage in response to a timing control signal generated when both the first and second driving voltages are in the high state.

* * * * *